United States Patent [19]

Mehada et al.

[11] 4,198,278
[45] Apr. 15, 1980

[54] METHOD FOR PRODUCING ANODE ALUMINUM FOILS FOR ELECTROLYTIC CONDENSERS

[75] Inventors: Masashi Mehada, Matsubara; Masahiko Kawai, Daito; Mitsuo Sasaki, Tondabaya; Tohru Kimura, Nara, all of Japan

[73] Assignee: Toyo Aluminum Kabushiki Kaisha, Osaka, Japan

[21] Appl. No.: 911,507

[22] Filed: Jun. 1, 1978

[30] Foreign Application Priority Data

Jun. 10, 1977 [JP] Japan .................................. 52-69155

[51] Int. Cl.² .............................................. C25F 3/04
[52] U.S. Cl. ........................... 204/129.75; 204/129.95
[58] Field of Search ............. 204/129.75, 129.8, 129.1, 204/129.95

[56] References Cited

U.S. PATENT DOCUMENTS

| | | | |
|---|---|---|---|
| 2,853,445 | 9/1958 | Catotti et al. | 204/129.75 |
| 3,284,326 | 11/1966 | Martin | 204/129.75 |
| 3,316,164 | 4/1967 | Welch, Jr. | 204/129.75 |
| 3,755,115 | 8/1973 | Van Herwijnen et al. | 204/129.75 |
| 3,887,447 | 6/1975 | Sheasby et al. | 204/129.75 |

FOREIGN PATENT DOCUMENTS

1186637  2/1965  Fed. Rep. of Germany ...... 204/129.75

*Primary Examiner*—T. M. Tufariello
*Attorney, Agent, or Firm*—Stevens, Davis, Miller & Mosher

[57] ABSTRACT

Improved method for producing anode aluminum foils for electrolytic condensers used in low and intermediate voltage applications in which a hard tempered aluminum foil consisting of 99.9 to 99.99% pure aluminum added with 0.010 to 0.25% by weight of copper is electrolytically etched in an aqueous solution of neutral chlorides such as sodium chloride, aluminum chloride or potassium chloride.

7 Claims, 3 Drawing Figures

METHOD FOR PRODUCING ANODE ALUMINUM FOILS FOR ELECTROLYTIC CONDENSERS

This invention relates to aluminum foils to serve as anodes of electrolytic condensers for intermediate or low voltage range applications, and more particularly to an improved method for producing electrode foils with a large capacitance.

The augmentation of the capacitance of an electrode foil for the electrolytic condenser normally relies on the increase of its surface area by electrolytic etching, and this has become an important technique in view of the increasing demand for electrolytic condensers of smaller sizes to cope with the general trend toward solid state or integrated electronic circuits, coupled with another advantage that the reduction of their sizes will lead to savings of natural resources.

In this connection, Japanese Patent Publication No. 45-25978 describes a method for producing a high-voltage electrode foil by electrolytically etching a 99.99% or more pure aluminum foil with a 0.004% to 0.01% by weight of copper content in an aqueous solution of hydrochloric acid. A similar technique is also disclosed in Japanese Patent Publication No. 51-44306, using a 99.9% pure aluminum foil with a 0.005% to 0.05% copper content.

In these prior art techniques, copper addition to high purity aluminum is considered to be a factor of accelerated chemical corrosion which occurs under the coexistance of aluminum and copper, as they distinctively differ from each other in electrode potential in a corrosive electrolyte essentially composed of hydrochloric acid. As a matter of fact, relatively rough step-like pits are formed through the interior of foil as a result of the chemical corrosion which proceeds simultaneously during the electrolytic etching process, contributing the enlargement of the surface area of the foil. Due to an unavoidable large weight loss of foil during the etching, however, the techniques of the electrolytic etching have thus far been limited to high-voltage electrode foils with a thick dielectric film thereon. In addition, the content of copper which considerably lowers the strength of the electrolytically etched foils has been limited to a relatively narrow range.

On the other hand, in case of intermediate and low-voltage electrode foils with a thin dielectric film, it is necessary to enlarge the surface area by electrolytic etching while suppressing the chemical dissolution at the foil surfaces to a minimum, in order to form fine pits by the electrolytic etching without detrimentally reducing the thickness of the foil. Consequently, there has been generally employed a method of electrolytical etching of a high purity aluminum foil with no addition of an alloying element such as copper, in a neutral electrolyte. For examples, the electrolytic etching of a hard tempered aluminum foil in the neutral electrolyte solution is disclosed in: M. S. Hunter, Electrochem. Technol., 117 1215 ('70); C. G. Dunn et al., ibid., 118 381 ('71); J. B. Brennan, U.S. Pat. No. 2,209,712; The British Aluminum, French Pat. No. 1,248,959; Sparaque Electric, U.S. Pat. No. 3,284,326; Philips, British Pat. No. 1,047,481; Becromal, German Published Patent Application No. 1,496,731 or British Pat. No. 1,110,131.

As a result of comprehensive research and experiments on the relations between the enlargement of surface area by the electrolytic etching and the structures of the etching pits on the low-, intermediate- and high-voltage electrode foils, the present inventors have found that they are closely related with each other and there are etching pits structures, chemical compositions and tempere of the aluminum foil which are particularly suited respectively to the low-, middle- or high-voltage electrode. Especially, to make the maximum use of the volume of a intermediate or low-voltage electrode foil, it is preferred to form fine tunnel-like pits growing inward the aluminum foil over its entire surface area and with a high density, while supressing or preventing the chemical dissolution at the foil surfaces during the electrolytic etching process. Direct observations and studies of etching pits through a scanning electron microscope have revealed that the formation of etching pits of such figure is essentially dictated by the combination of the conditions of the electrolytic etching and the composition and tempere of the aluminum foil. As a result of further studies, it has now been found that the above-discussed technical problems can be solved by an electrolytical etching of a hard tempered aluminum foil consisting of 99.9% to 99.99% pure aluminum added with 0.010% to 0.25% by weight of copper in an aqueous solution of a neutral chloride, preferably under the coexistence of a corrosion inhibitor.

An understanding of the invention may be facilitated by reference to the accompanying drawings in which.

Figure 1:
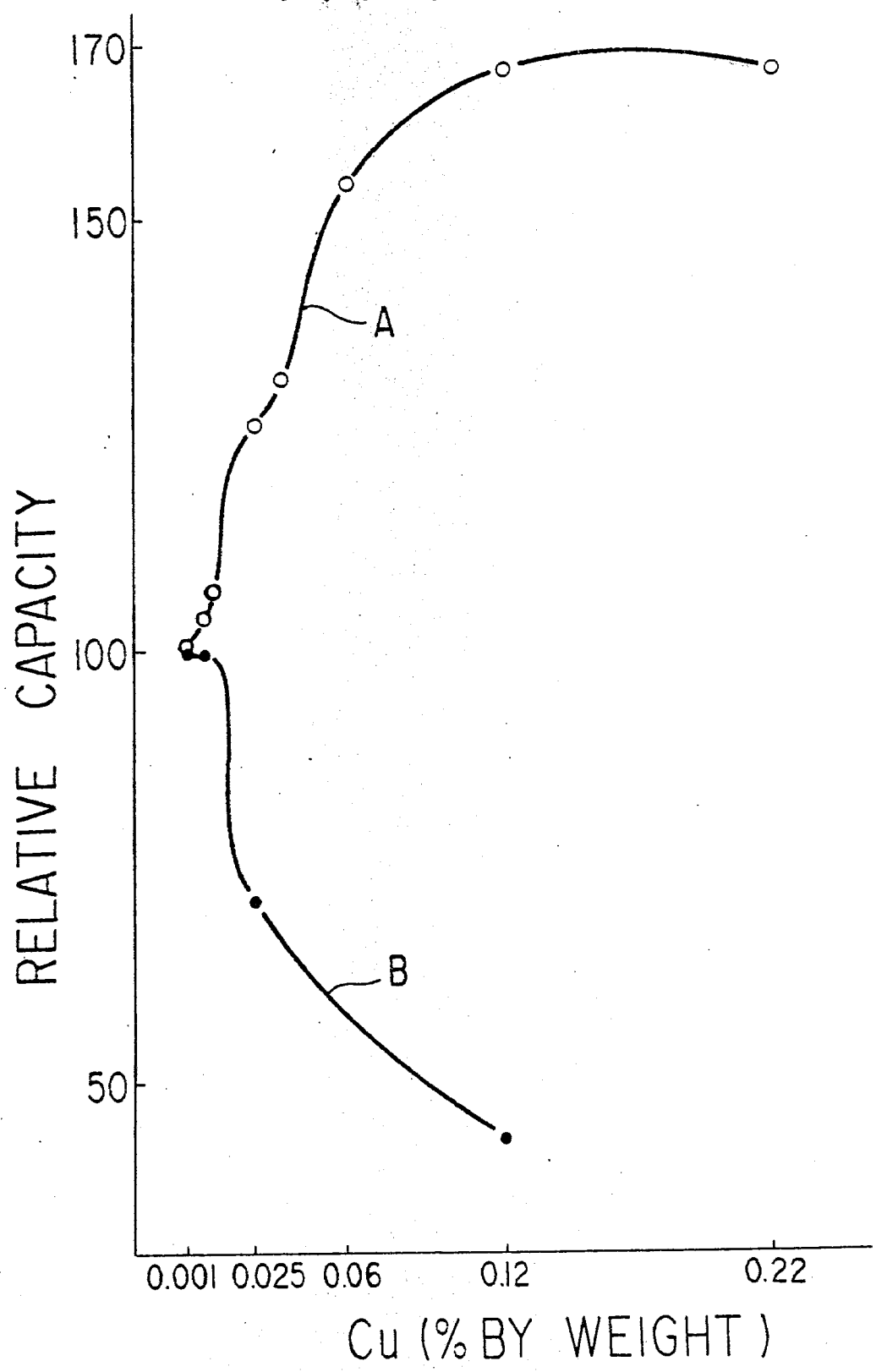
FIG. 1 is a diagram illustrating the relation between the Cu contents of starting hard tempered aluminum foils and the capacitance thereof after electrolytically etched and formed as in the manner of Test Example 1 (Curve A) or Comparative Example (Curve B) described hereinafter.
Figure 2:
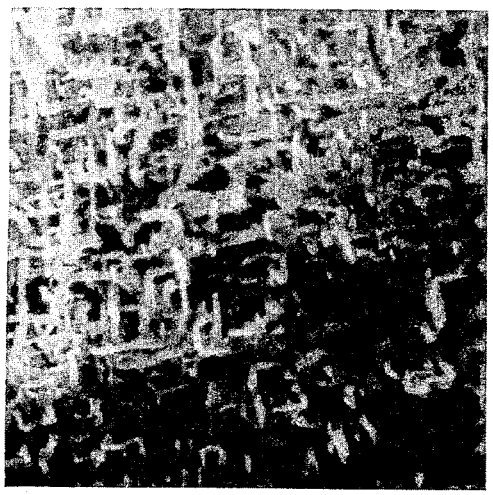
FIGS. 2 to 3 are micrographs (by scanning electron microscope: ×3000) of the anode aluminum foil prepared by the method of the invention (Sample No. 23 in Test Example 4) or the prior arts (Sample No. 20' in Test Example 4), respectively.
Figure 3:
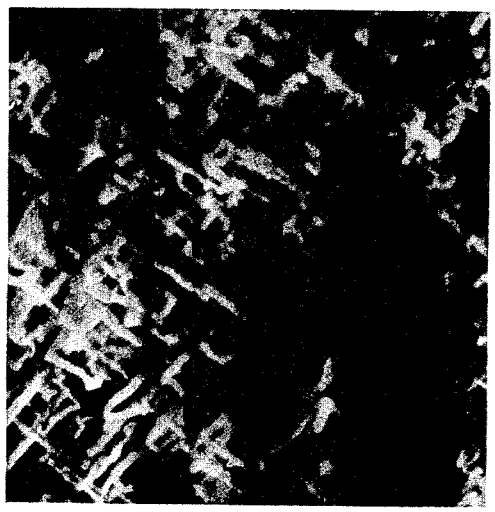

As apparent from these figures in the electrolytic etching in a neutral electrolyte employed in the method of the invention, the content of copper as an alloying element may be increased to an amount far exceeding the conventionally critical values (0.005% in 99.99% pure aluminum and 0.020% in 99.99% pure aluminum) and is considered to have the effects of suppressing the number of the initial etching points which are instantaneously formed on the surface of the foil, thereby remarkably increasing the density of the fine complicate tunnel-like pits which grow inward the foil.

The examples of the neutral chloride suitable for use in this invention include sodium chloride, aluminum chloride, potassium chloride or other neutral metal chloride, and the preferable content is 10 to 20% by weight based on the amount of the solution. Two or more of these neutral chlorides can be used in an etching solution.

The examples of the corrosion inhibitor suitable for use in this invention include sulfuric acid ion, phosphoric acid ion, oxalic acid ion, chromic acid ion, boric acid ion or other acid radical which have a capability of anodic film formation on the aluminum foil surface.

The preferable amount of these corrosion inhibitors is 0.2 to 3.0, 0.5 to 3.0, 0.5 to 30, 0.5 to 30 and 0.01 to 1.0 for sulphete, phosphate, oxalate, borate and chromate, respectively. Two or more of these corrosion inhibitors can be used in an etching solution and the preferable amount is 0.011 to 5.0% by weight in total.

The invention will be describe in more detail by the following examples.

TEST EXAMPLE 1

0.1 mm thick aluminum foils were prepared, adding 0.001% to 0.22% of Cu to 99.99% pure aluminum which contained 0.002% of Fe and 0.002% of Si as impurities, so that the Cu content was 0.001 to 0.22 wt.%. The capacitance which will be evaluated hereinlater vary depending upon the conditions in the heat treatment of ingots or hot rolling. However, it was observed that the addition of Cu gave the similar effects in most cases, so that this and the following Examples commonly used 0.1 mm thick aluminum foils which had been prepared by cold-rolling an ingot after homogenization at 550° C. for 10 hr.

The hard tempered aluminum foils thus obtained after rolling were subjected to the electrolytic etching under the conditions given below and subsequently to the measurement of the electrostatic capacity.

Electrolytic Etching: An aluminum foil having a dimension of 0.1 mm×60 mm×100 mm was put in an aqueous solution of 10% by weight of sodium chloride (80° C.) and placed between cathode plates of graphite to serve as an anode, followed by application of a DC voltage across the electrodes. The current density was 90 A/60 cm$^2$ and the quantity of the applied electricity was 9,000 coulomb/dm$^2$.

Anodic Oxide Film Formation

A sample of 25 mm×50 mm was cut from the foil which had been etched in the above-described manner and put in a forming solution consisting of 100 g/l of boric acid and 15 g/l of ammonium borate. The sample was interposed between cathode plates of tin foils with intervals of 20 mm therefrom and a DC current of 150 mA was applied across the electrodes for anodic oxide film formation until the formation voltage reached 50 V. The formation voltage of 50 V was maintained until the current dropped down to 4 mA whereupon terminating the formation of the anodic oxidation film.

Measurement

The sample which had been formed with the anodic oxidation film in the above-described manner was put in a 70 mm diameter cylindrical aluminum container filled with an 80 g/l solution of ammonium borate and its capacitance was measured by means of a universal bridge (120 cycles/sec) using the aluminum container as an opposite pole.

The relation between the Cu content and the capacitance was as follows and also shown as Curve A in FIG. 1:

| Sample No. | Cu Content | Comparative Capacitance |
| --- | --- | --- |
| 1 | 0.001 | 100 |
| 2 | 0.006 | 104 |
| 2' | 0.010 | 107 |
| 3 | 0.025 | 126 |
| 4 | 0.035 | 131 |
| 5 | 0.06 | 154 |
| 6 | 0.12 | 167 |
| 7 | 0.22 | 167 |

Note: the capacitance is indicated by way of an index number against the capacitance at Cu=0.001% taken as 100.

TEST EXAMPLE 2

0.1 mm thick aluminum foils were prepared by adding Cu to 99.9% pure aluminum which contained 0.03% by weight of Fe and 0.03% by weight of Si as impurities, so that the Cu content was 0.001 to 0.1 wt.%, and subjected to the electrolytic etching, anodic oxide film formation and measurement of capacitance in the same manner as in Example 1. The index numbers of the capacitance relative to the Cu content were as shown in the following table where the value at Cu=0.001% is taken as 100.

| Sample No. | Cu Content | Comparative Capacitance |
| --- | --- | --- |
| 8 | 0.001 | 100 |
| 9 | 0.03 | 124 |
| 10 | 0.05 | 132 |
| 11 | 0.7 | 150 |
| 12 | 0.10 | 165* |

*Absolute value: 18.0 μF/cm$^2$

TEST EXAMPLE 3

0.1 mm thick aluminum foils were prepared by adding Cu to 99.9% pure aluminum which contained 0.005% by weight of Fe and 0.005% by weight of Si as impurities, so that the Cu content was 0.001 to 0.22 wt.%, and subjected to the electrolytic etching, anodic oxide film formation and measurement of capacitance in the same manner as in Example 1 except that 10% by weight of aluminum chloride (AlCl$_3$) was used for the electrolytic bath for the etching operation instead of 10% by weight of sodium chloride. The index numbers of the capacitance relative to the Cu content were as shown in the following table where the value at Cu=0.001% is taken as 100.

| Sample No. | Cu Content | Comparative capacitance |
| --- | --- | --- |
| 13 | 0.001 | 100 |
| 14 | 0.015 | 114 |
| 15 | 0.025 | 122 |
| 16 | 0.035 | 142 |
| 17 | 0.06 | 156 |
| 18 | 0.12 | 170 |
| 19 | 0.22 | 152 |

TEST EXAMPLE 4

0.1 mm thick aluminum foils were prepared by adding 0.049% by weight of Cu to 99.9% pure aluminum which contained 0.010% by weight of Fe, 0.010% by weight of Si and 0.001% by weight of Cu in the same manner as in Example 1. For comparison, an aluminum foil having the same Fe and Si contents were also prepared without adding Cu (Sample No. 20') in which the Cu content was 0.001% by weight.

In this instance, the electrolytic etching, anodic oxide film formation and measurement of capacitance were carried out in the same manner as in Example 1 except that a variety of aqueous solutions A to I were used for the electrolytic bath for the etching, as shown below.

A: 10 wt% of sodium chloride;
B: 10 wt% of sodium chloride+1 wt% of aluminium sulphate [Al$_2$(SO$_4$)$_3$];
C: 10 wt% of aluminum chloride (AlCl$_3$);

D: 10 wt% of aluminum chloride (AlCl$_3$)+1 wt% of aluminium sulphate [Al$_2$(SO$_4$)$_3$];
E: 15 wt% of potassium chloride;
F: 10 wt% of sodium chloride+4 wt% of phosphoric acid;
G: 10 wt% of sodium chloride+1 wt% of boric acid;
H: 10 wt% of sodium chloride+0.1 wt% of chromic anhydride; and
I: 10 wt% of sodium chloride+1 wt% of boric acid.

The results are shown in the following table where the capacitance is indicated by way of an index number based on the capacitance of Sample No. 20'.

| Sample No. | Electrolytic Bath | Comparative Capacitance |
|---|---|---|
| 20 | A | 150 |
| 20' | A | 100 |
| 21 | B | 179 |
| 22 | C | 133 |
| 23 | D | 186* |
| 24 | E | 126 |
| 25 | F | 158 |
| 26 | G | 168 |
| 27 | H | 167 |
| 28 | I | 154 |

*Absolute value: 16.4 μF/cm$^2$

COMPARATIVE EXAMPLE 0.1 mm thick aluminum foils were prepared by adding Cu to 99.99% pure aluminum which contained 0.005% by weight of Fe and 0.005% by weight of Si, so that the Cu content was 0.001 to 0.12 wt.% in the same manner as in Example 1.

The foils were subjected to the electrolytic etching, anodic oxide film formation and measurement of capacitance according to the procedures described in Example 1 except for some changes in the electrolytic etching conditions as indicated below.

Electrolytic bath:
5 vol % of hydrochloric acid,
50° C.
Current density:
40 A/60 cm$^2$ The values of the capacitance relative to the Cu content were shown as curve B in FIG. 1 and summarized in the following table where the respective values are indicated by way of an index number as compared with the value at Cu=0.001 which is taken as 100.

| Sample No. | Cu Content | Electrostatic Capacity |
|---|---|---|
| 29 | 0.001 | 100 |
| 30 | 0.010 | 100 |
| 31 | 0.025 | 71 |
| 32 | 0.12 | 43 |

What is claimed is:

1. In a method for producing an anode aluminum foil for an electrolytic condenser by electrolytically etching an aluminum foil in an aqueous solution of neutral chloride, the improvement which comprises:
providing said aluminum foil in a form which is hard tempered and consisting of 99.9 to 99.99% pure aluminum added with more than 0.010 to 0.25% by weight of copper as an alloying element for increasing the density of the fine tunnel-like pits which grow inward said foil.

2. The method of claim 1 in which said hard tempered aluminum foil is added with more than 0.010 to 0.10% by weight of copper while said aqueous solution of neutral chloride includes 10 to 20% by weight of at least two neutral chlorides selected from the group consisting of sodium chloride, aluminum chloride and potassium chloride.

3. The method of claim 1 or 2 in which said aqueous solution of neutral chloride includes a corrosion inhibitor for aluminum.

4. The method of claim 3 in which said corrosion inhibitor is at least one of acid radicals selected from the group consisting 0.2 to 3.0% by weight of sulphate, 0.5 to 3.0% by weight of phosphate, 0.5 to 3.0% by weight of oxalate, 0.5 to 3.0% by weight of borate and 0.01 to 1.0% by weight of chromate, based on the amount of the solution.

5. The method of claim 3 in which said corrosion inhibitor is 0.011 to 5.0% by weight of mixture of at least two acid radicals based on the amount of the solution and selected from the group consisting of sulphate, phosphate, oxalate, borate and chromate.

6. An anode aluminum foil for electrolytic condenser produced by the method of claim 1 or 2 and having a capacitance of at least about 15 μF/cm$^2$ after subjected to the anodic oxide film formation with the 50 V-formation voltage.

7. An anode aluminum foil for an electrolytic condenser having a capacitance of at least about 15 μF/cm$^2$ after being subjected to anodic oxide film formation with 50 V-formation voltage, said foil having been produced by electrolytically etching a hard tempered foil having at least 99.9% aluminum and added with 0.010 to 0.25% by weight copper in an aqueous solution of neutral chloride, whereby the numbered initial etching points instantaneously formed on the surface of said foil is minimized, increasing the density of fine tunnel-like pits growing inward from the surface of said foil.

* * * * *